(12) United States Patent
Plow et al.

(10) Patent No.: US 8,086,576 B2
(45) Date of Patent: *Dec. 27, 2011

(54) APPARATUS AND SYSTEM FOR REORGANIZING A SET OF DATABASE PARTITIONS

(75) Inventors: Gregory Maurice Plow, Poulsbo, WA (US); Farrokh E. Pourmirzaie, San Jose, CA (US); Tatsuyuki Shiomi, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 531 days.

This patent is subject to a terminal disclaimer.

(21) Appl. No.: 12/246,988

(22) Filed: Oct. 7, 2008

(65) Prior Publication Data

US 2009/0049110 A1 Feb. 19, 2009

Related U.S. Application Data

(63) Continuation of application No. 11/313,089, filed on Dec. 20, 2005, now Pat. No. 7,454,449.

(51) Int. Cl.
*G06F 7/00* (2006.01)
*G06F 17/00* (2006.01)
(52) U.S. Cl. ......... 707/693; 707/748; 707/968; 707/972
(58) Field of Classification Search .................. 707/693, 707/748, 968, 953, 972, E17.054
See application file for complete search history.

(56) References Cited

U.S. PATENT DOCUMENTS

| | | | |
|---|---|---|---|
| 5,721,915 A | 2/1998 | Sockut et al. | |
| 5,758,144 A | 5/1998 | Eberhard et al. | |
| 5,832,491 A | 11/1998 | Tatsumi et al. | |
| 5,835,755 A * | 11/1998 | Stellwagen, Jr. | 707/764 |
| 5,903,757 A | 5/1999 | Gretz et al. | |
| 5,991,761 A * | 11/1999 | Mahoney et al. | 707/700 |
| 6,122,640 A | 9/2000 | Pereira | |
| 6,292,178 B1 * | 9/2001 | Bernstein et al. | 345/173 |
| 6,553,383 B1 | 4/2003 | Martin | |
| 6,557,014 B1 * | 4/2003 | Cellis et al. | 707/E17.005 |
| 6,633,884 B2 * | 10/2003 | Martin et al. | 707/999.104 |
| 2002/0143763 A1 * | 10/2002 | Martin et al. | 707/7 |
| 2004/0143589 A1 * | 7/2004 | Martin, Jr. | 707/100 |

(Continued)

OTHER PUBLICATIONS

Klara Nahrstedt and Jonathan Smith—"Design, Implementation, and Experiences of the OMEGA End-Point Architecture"—Selected Areas in Communications, IEEE Journal on Sep. 1996, vol. 14, Issue 7 (pp. 1265-1279:1-17).*

(Continued)

*Primary Examiner* — John E Breene
*Assistant Examiner* — Anh Ly
(74) *Attorney, Agent, or Firm* — Kunzler Needham Massey & Thorpe

(57) ABSTRACT

An apparatus and system are disclosed for reorganizing a set of database partitions based on a ranked set of database partitions. The apparatus includes an evaluation module to determine a fragmentation indicator for each database partition within a set of database partitions. A ranking module ranks the set of database partitions according to a rank criteria. The rank criteria includes, at a minimum, the fragmentation indicator. A reorganization module reorganizes a subset of the database partitions in the ranked set of database partitions. The subset is selected, at least in part, by a rank order for the ranked set of database partitions. The subset may be selected such that ranked database partitions satisfying a dynamic reorganization threshold are included in the subset.

20 Claims, 6 Drawing Sheets

U.S. PATENT DOCUMENTS

| | | | | |
|---|---|---|---|---|
| 2005/0091009 | A1* | 4/2005 | Belcher et al. | 703/1 |
| 2005/0165713 | A1* | 7/2005 | Lafforet | 707/1 |
| 2006/0206507 | A1* | 9/2006 | Dahbour | 707/104.1 |
| 2008/0028199 | A1* | 1/2008 | Armstrong et al. | 713/1 |

OTHER PUBLICATIONS

Guoray Cai—"GeoVIBE: A Visual Interface for Geographic Digital Libaries"—Visual Interfaces to Digital Libraries,, Computer Science, 2002, vol. 2539/2002, (pp. 171-187)—Springer-Verlag Berlin Heidelberg, 2002.*

IMS/VS Data Base Tool, Data Entry Data Base Tuning Aid User's Guide Release 1.0 (Program No. 5668-856; Document No. SH20-6590-0; First Edition: Mar. 1985), pp. 6-7, 16-21, 27-32, 38.

IMS/VS Data Base Tool, Data Entry Data Base Pointer Checker User's Guide Release 1.0 (Program No. 5668-856, Document No. SH2O-6584-0; First Edition: Mar. 1985) pp. 2, 5-6, 14, 16, 29-31, 37-41, 47-52, 59-77, 84, 88-89, 91-93.

Bruni, Paolo et al., DB2 for z/OS and OS/390 Version 7 Performance Topics, IBM ITSO Redbook, SG24-6129-00, Jul. 2001, (http://www.redbooks.ibm.com/abstracts/sg246129.html) Sections: 6.6.4 Performance considerations using new statistics columns (pp. 141-146).

Bruni, Paolo et al., DB2 for zJOS and OS/390 Version 7 Using the Utilities Suite, IBM ITSO Redbook, SG24-6289-00, Aug. 2001, (http://www.redbooks.ibm.com/abstracts/sg246289.html) Chapter 7, pp. 162-163, pp. 161-190.

McIver, Jr., "An Approach to Self-Adaptive, On-Line Reclustering of Complex Object Data", Section 2.4, Chapters 3 and 4.

McIver, Jr., "Self-Adaptive, On-Line Reclustering of Complex Object Data", all pages.

* cited by examiner

APPARATUS AND SYSTEM FOR REORGANIZING A SET OF DATABASE PARTITIONS

CROSS-REFERENCES TO RELATED APPLICATIONS

This application is a continuation of and claims priority to U.S. patent application Ser. No. 11/313,089, now U.S. Pat. No. 7,454,449 B2 entitled "METHOD FOR REORGANIZING A SET OF DATABASE PARTITIONS" and filed on Dec. 20, 2005 for Gregory M. Plow, et al., which is incorporated herein by reference.

FIELD OF THE INVENTION

This invention relates to the placement of database information on a storage device and more particularly relates to reorganizing a set of database partitions.

DESCRIPTION OF THE RELATED ART

Databases are a critical part of many computer systems due to their ability to store pieces of information, conventionally referred to as fields, along with a structure that describes links or relationships between the fields. Databases are physically stored on one or more storage devices such as disk drives, tape drives, optical drives, solid-state memory, and the like. Each field occupies a predetermined amount of storage on a storage device. The space occupied by the field is typically measured in bits or bytes. Quickly retrieving database data from a storage device is critical to most computer systems.

The time required to quickly retrieve a database data from a storage device depends, in part, on the manner that fields are physically stored on a storage device. For example, a database that is stored on a single storage device so that the fields of the database are stored adjacent to each other takes less time to retrieve than a database stored so that the fields of the database are located in several different, non-contiguous locations on the storage device. Non-contiguous fields take longer to retrieve because several different locations on the storage device are physically accessed.

When reading database data from a disk drive, for example, the read head of the disk drive is physically positioned above the area on the disk where the fields of the database are stored. If the fields are stored adjacent to each other in a contiguous area, the read head is positioned once.

In contrast, to read database data made up of non-contiguously stored fields, the read head will be physically repositioned for each non-contiguous area where fields are stored. Repositioning the read head takes longer than reading a field from the disk once the read head is positioned. Consequently, the total amount of time required to read database data stored non-contiguously is longer than the time required to read the same database data stored contiguously.

Conventional storage devices are divided into small storage areas referred to as blocks. Typically, each block has a predetermined size measured in bytes. Conventional databases set aside a portion of a storage device referred to as a partition for database data. The partition is made up of a predetermined number of blocks. The fields are stored within the blocks making up the partition. The size of the blocks and the number of blocks in a partition are typically configurable and can be optimally selected based on the characteristics of a particular database or database record or table.

The initial layout of a database on a storage device can change over time. For example, the database may have added fields, each field holding information about a particular customer. The added fields may change the partition and/or block layout on the storage device.

In addition, fields may be of variable size. Consequently, as data in fields grows or shrinks, the data may no longer fit in the original partition and block layout. If the partitions/blocks storing existing fields on the storage device do not have enough space to accommodate the longer data values, the new data will not be stored contiguously with the original fields because the storage space adjacent to the old field may be occupied. The new data will have to be stored in some other non-contiguous portion of the storage device. Consequently, the partition becomes fragmented since the field data values are no longer contiguously stored on the storage device.

Some database partitions are designed to accommodate subsequently added data in dependent overflow blocks. Dependent overflow blocks provide storage space that can be used by the database structure occupying a particular partition. If the database structure occupying the partition does not require the space provided by the dependent overflow blocks, the dependent overflow blocks go unused. A database structure is allowed to use the dependent overflow blocks that are part of its corresponding partition and is not allowed to use dependent overflow blocks that are part of another partition.

Another method to accommodate subsequently added data is to provide independent overflow blocks. Independent overflow blocks are associated with a set of partitions and can be assigned to any one of the partitions within the set. Once assigned to a particular partition, an independent overflow block is used for that particular partition and is not available to the other partitions of the set.

Independent overflow blocks are typically stored on the storage device immediately adjacent to the set of partitions. While they are not contiguous with all of the partitions of the set, the independent overflow blocks are physically close to all of the partitions of the set. As a result, the time required to retrieve data from an independent overflow block is less than would be required to retrieve data from a randomly located block on the storage device.

If increased data size cannot be accommodated by the use of both dependent and independent overflow blocks, additional blocks elsewhere on the storage device can be allocated to the partition. These additional blocks might not be located in a predictable location with respect to the rest of the partition, and thus will require additional time to retrieve.

Many different conventional databases are available, each of which may use different terms to describe the storage scheme described above. For example, in the case of a Data Entry Database (DEDB), a partition is known as an area and a block is known as a Control Interval (CI). In each area of a DEDB, a Unit of Work (UOW) is yet another example of a partition that has both dependent and independent overflow blocks. In other databases, a partition is known as a set of extents and blocks are known as pages or records.

Deleting fields or data from records in a database table or structure can also lead to unnecessarily slow table retrieval. For example, a database structure, as originally designed, may fit within a standard partition. One or more new fields can then be added to the database structure. If there is not room in the partition for the new fields, overflow blocks will be required to accommodate the new fields.

Next, one or more of the original fields stored in the partition may be deleted from the database structure. The resulting partition now has free space resulting from the deleted fields. The new fields, stored in the overflow blocks, could be stored in the free space. However, unless the new fields are moved from the overflow blocks into the free space of the partition, the new fields will continue to be stored non-contiguously in overflow blocks and the partition will remain fragmented.

As the database changes, fields and data records will be added to or deleted from database structures with the result that a greater number of the partitions of the database become fragmented. Consequently, the performance of the database degrades since it takes longer to retrieve fragmented database records from a storage device than it does to retrieve non-fragmented database records.

To resolve this performance problem, it is possible to reorganize the fragmented database partitions by rearranging the fields stored on the storage device so that the fields of a database structure are stored contiguously. Reorganization can be accomplished by recovering free space, by creating larger partitions, or by other techniques well known to those of skill in the art.

Reorganizing partitions can be very invasive because it can delay or prevent access to the records of the database. Since reorganizing partitions entails rearranging data within a storage device, fulfilling a request to access data on the storage device is delayed because the storage device will be busy processing reorganization requests. In addition, while a particular partition is being reorganized, the data records stored by that particular partition are not available to database users. Delaying or preventing access to the database is unacceptable in many database applications.

Consequently, reorganization is least invasive when performed during times of low database usage. For example, performing reorganization of a customer database at night when user demand for access to the customer database is low is less invasive than performing reorganization during business hours.

FIG. 1A illustrates a conventional method 100 for reorganizing a set of database partitions. The method begins 102 when a database administrator selects 104 a fragmentation threshold. The fragmentation threshold, as used herein, refers to a maximum level of fragmentation acceptable for partitions. The administrator selects the threshold without knowledge of the degree of partition fragmentation that exists in the database. Next, the degree to which each partition of the database is fragmented is evaluated 106 to determine a fragmentation value 154. (See FIG. 1B)

The fragmentation value 154 can be determined using a number of different methods. For example, the fragmentation value 154 can be the number of dependent or independent overflow blocks assigned to the partition. The fragmentation value 154 can also be a percentage of the partition that is not contiguous. The fragmentation value 154 can also be the amount of free space within a partition that is using overflow blocks.

Next, the partitions with a fragmentation value 154 satisfying the fragmentation threshold are reorganized 108. Once reorganization is complete, the database administrator reviews 110 the reorganization results. Reviewing the reorganization results can entail reviewing a list of the partitions that were reorganized, reviewing how much free space was recovered, and reviewing the resulting database performance improvement. The method 100 ends 112.

The method 100 described above is problematic for databases that require rapid response because the database administrator does not know the degree of partition fragmentation existing in the database before selecting the fragmentation threshold. Consequently, the database administrator is unable to control the number of partitions that will be reorganized. If the database administrator selects a threshold that is too low, a large number of partitions will be reorganized. The time required to reorganize this large number of partitions may not fit within the period of low usage.

For example, a customer database may have low usage for six hours each night during which a database administrator can perform partition reorganization with minimal impact to database users. If the database administrator selects a threshold that leads to a large number of partitions being reorganized, the partition reorganization may not finish within the six hour low usage period. Instead, the partition reorganization may extend into a high usage period where the impact of partition reorganization on users is intolerable.

Alternatively, if the database administrator selects a fragmentation threshold that is too high, a small number of partitions will be reorganized. This can also be problematic since a database administrator may want to maximize the number of partition reorganizations that occur during the six hour low usage period. If too few partitions are reorganized, the low usage period will not be used effectively, especially if the database administrator is not present to initiate another partition reorganization once the original partition reorganization is complete.

At the time the database administrator makes a fragmentation threshold selection, he does not know whether the fragmentation threshold he selects will be too low, too high, or just right because he does not know the degree of partition fragmentation existing in the database. Consequently, the database administrator uses a trial and error process of selecting a fragmentation threshold that can impose undesirable delays on database users.

FIG. 1B is a chart 150 illustrating an example set of database partition identifiers 152 and corresponding fragmentation values 154. The fragmentation value 154, in this example, is a percentage representing the amount of data in the partition that is fragmented. Suppose, the fragmentation threshold is three percent. The shaded rows 156 of the chart 150 represent partitions that have a fragmentation value 154 greater than or equal to the fragmentation threshold of three percent. In this example, the three percent fragmentation threshold results in more than half of the database being reorganized which may take an unacceptable amount of time.

Had the database administrator been aware that more than half of the partitions would be reorganized as a result of this threshold choice of three percent, he may have increased his threshold choice to reduce the number of partitions that would be reorganized. However, the database administrator is unable to do this because he is not able to see the fragmentation values 154 before selecting a fragmentation threshold.

From the foregoing discussion, it should be apparent that a need exists for an apparatus and system for more efficiently reorganizing a set of database partitions. The apparatus, system, and method should ensure that a database administrator has greater control over the number of database partitions to be reorganized. Additionally, the apparatus, system, and method should provide a method to estimate both the amount of resources that will be required for a particular reorganization and the expected performance improvement that will result from the reorganization.

SUMMARY OF THE INVENTION

The present invention has been developed in response to the present state of the art, and in particular, in response to the problems and needs in the art that have not yet been fully solved by currently available database partition reorganization methods. Accordingly, the present invention has been developed to provide an apparatus and system for reorganizing a set of database partitions that overcome many or all of the above-discussed shortcomings in the art.

The apparatus for reorganizing a set of database partitions is provided with a logic unit containing a plurality of modules configured to functionally execute the steps of reorganizing a set of database partitions. These modules in the described embodiments include an evaluation module, a ranking module, and a reorganization module. In one embodiment, the apparatus includes a presentation module, an input module, an estimation module, and a recommendation module.

The evaluation module determines a fragmentation indicator for each database partition within a set of database partitions. The fragmentation indicator indicates the degree to which a database partition has been fragmented on a storage volume or storage subsystem. The set of database partitions may include all the partitions of a database or may include a subset of the partitions of a database.

In one embodiment, the fragmentation indicator is determined by evaluating a fragmentation function for each database partition within the set of database partitions. In one embodiment, the fragmentation function determines whether a database partition has at least a predetermined amount of free space and whether the database partition comprises at least a predetermined number of overflow blocks.

The ranking module ranks the set of database partitions in order according to a rank criteria. The rank criteria preferably includes the fragmentation indicator. The rank criteria may also include other parameters such as a database name or volume number.

The reorganization module reorganizes a subset of the ranked set of database partitions. Reorganizing a database partition comprises arranging the data making up the database partition in an optimal manner on a physical storage volume. The subset of database partitions is defined, at least in part, by a rank order for the ranked set of database partitions. Preferably, the reorganization module reorganizes the subset of the ranked set of database partitions in rank order by reorganizing the highest ranked database partition first and the lowest ranked database partition last. In one embodiment, the reorganization module reorganizes all partitions in the ranked set.

The subset of the database partitions may include database partitions that satisfy a reorganization threshold. Preferably, the reorganization threshold is a number (quantity) of the ranked database partitions or a percentage of the ranked database partitions. In one embodiment, a user may manually add or remove a selected database partition to the subset of the database partitions so that the reorganization module reorganizes the selected database partition in addition to those in the subset.

In one embodiment, the presentation module presents the ranked set of database partitions to a user for evaluation. In one embodiment, an input module prompts the user for a reorganization threshold in response to the evaluation. A recommendation module may recommend a reorganization threshold to the user.

In one embodiment, the estimation module estimates a quantity of computing resources required to reorganize the subset of database partitions. The estimation module may also estimate a database performance improvement that will result from reorganizing the subset of database partitions. The presentation module may present the user with the estimated quantity of computing resources required and the estimated database improvement.

A system of the present invention is also presented for reorganizing a set of database partitions. The system, in one embodiment, includes a processor, one or more storage devices, a database, Input/Output (I/O) devices, a communication bus, a memory, and a reorganization utility.

The storage device stores database partitions comprising the database. In one embodiment, the database partitions are stored on more than one storage device. A user interacts with the system using the I/O devices. The communication bus operatively couples the processor, storage device, I/O devices, and memory.

The reorganization utility includes the modules of the apparatus described above including the evaluation module, ranking module, and reorganization module. In one embodiment, the reorganization utility includes the presentation module, input module, estimation module, and recommendation module also described above. The memory stores the reorganization module and may additionally store a user interface. The processor executes the reorganization utility and user interface.

A method for reorganizing a set of database partitions is also provided. The method in the disclosed embodiments substantially includes the steps necessary to carry out the functions presented above with respect to the operation of the described apparatus and system.

A fragmentation indicator is determined for each database partition within a set of database partitions. The database partitions are ranked according to a rank criteria. The rank criteria includes the fragmentation indicator and may include other parameters.

In one embodiment, the ranked set of database partitions is presented to a user for evaluation. Next, a subset of the ranked set of database partitions is defined, at least in part, by a rank order for the ranked set of database partitions. Preferably, the database partitions comprising the subset satisfy a reorganization threshold.

In one embodiment, the user is prompted for the reorganization threshold. Alternatively, the reorganization threshold may comprise a default or predefined value. Next, a quantity of computing resources required to reorganize the subset may be estimated, along with a resulting performance improvement. In one embodiment, a recommended reorganization threshold is presented to the user. Finally, the subset of the database partitions is reorganized.

The apparatus and system reorganize a preferably user-determined subset of the set of database partitions. The apparatus and system reduce the possibility that too many or too few database partitions will be reorganized by ranking the set of database partitions and allowing a user to select how the subset of the ranked set of database partitions is chosen. Consequently, the user is aware of the size of the subset of database partitions that will be reorganized before the reorganization is performed. These features and advantages will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

One preferred embodiment, in accordance with the present invention, is directed to a programmed method for reorganizing a set of database partitions. The term "programmed method," as used herein, is defined to mean one or more process steps that are presently performed; or, alternatively, one or more process steps that are enabled to be performed at a future point in time. This enablement for future process step performance may be accomplished in a variety of ways. For example, a system may be programmed by hardware, software, firmware, or a combination thereof to perform process steps; or, alternatively, a computer-readable medium may embody computer readable instructions that perform process steps when executed by a computer.

The term "programmed method" anticipates four alternative forms. First, a programmed method comprises presently performed process steps. Second, a programmed method comprises a computer-readable medium embodying computer instructions, which when executed by a computer, perform one or more process steps. Third, a programmed method comprises an apparatus having hardware and/or software modules configured to perform the process steps. Finally, a programmed method comprises a computer system that has been programmed by software, hardware, firmware, or any combination thereof, to perform one or more process steps.

It is to be understood that the term "programmed method" is not to be construed as simultaneously having more than one alternative form, but rather is to be construed in the truest sense of an alternative form wherein, at any given point in time, only one of the plurality of alternative forms is present. Furthermore, the term "programmed method" is not intended to require that an alternative form must exclude elements of other alternative forms with respect to the detection of a programmed method in an accused device.

Figure 2:
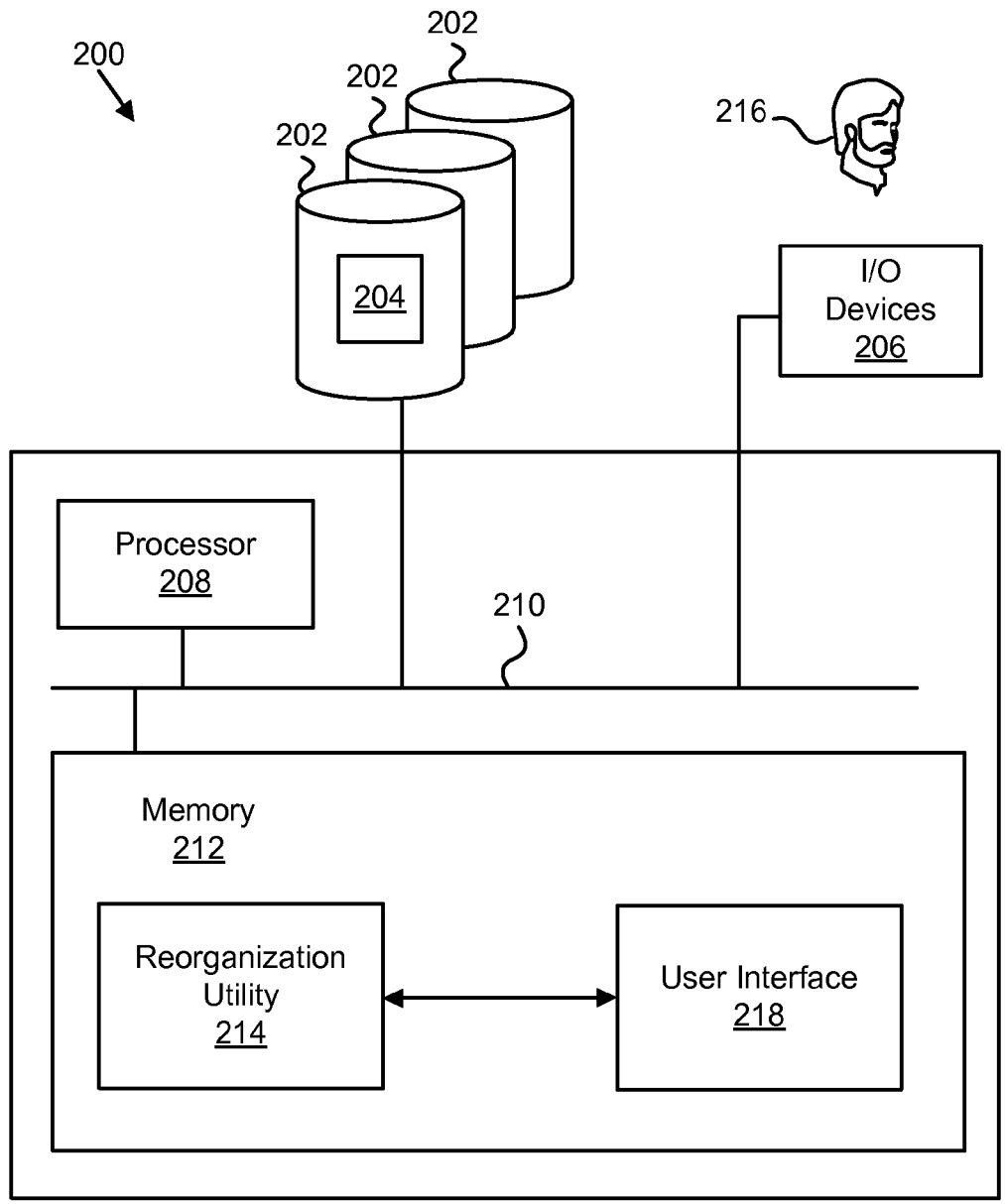
FIG. 2 is a block diagram illustrating one embodiment of a system for reorganizing a set of database partitions in accordance with the present invention.

FIG. 2 illustrates one embodiment of a system 200 for reorganizing a set of database partitions. The system 200 includes one or more storage devices 202, a database 204, Input/Output (I/O) devices 206, a processor 208, a communication bus 210, a memory 212, and a reorganization utility 214. Those of skill in the art will recognize that the system 200 may be more simple or complex than illustrated so long as the system 200 includes modules or sub-systems that correspond to those described herein.

The storage device 202 stores database partitions comprising the database 204. The storage device 202 may be a Direct Access Storage Device (DASD), a disk drive, a tape drive, solid state memory, or other memory whether volatile or non-volatile. In one embodiment, the database partitions are stored on more than one storage device 202.

A user 216 interacts with the system 200 using the I/O devices 206. The I/O devices 206 include standard devices such as a keyboard, monitor, mouse, and the like. The I/O devices 206 are coupled to the communication bus 210. Typically, the processor 208 comprises one or more central processing units executing software and/or firmware to control and manage the other components within the system 200.

The communication bus 210 operatively couples the processor 208, storage device 202, I/O devices 206, and memory 212. The communication bus 210 may be a bus, a wired network, a wireless network, or other connective communication technology. The communication bus 210 may employ the use of multiple, layered communication protocols including Ethernet, Internet Protocol (IP), Asynchronous Transfer Mode (ATM), Time Division Multiplexing (TDM), Peripheral Communication Interface (PCI), Small Computer System Interface (SCSI), and the like.

The memory 212 stores the reorganization utility 214 and may also store a user interface 218. The reorganization utility 214 determines a fragmentation indicator for each database partition within a set of database partitions. The fragmentation indicator indicates the degree to which a database partition has been fragmented on a storage device 202. The set of database partitions may include all the partitions of the database 204 or may include a subset of the partitions of the database 204.

Preferably, the fragmentation indicator is determined by evaluating a fragmentation function for each database partition within the set of database partitions. In one embodiment, the fragmentation function determines whether a database partition has at least a predetermined amount of free space and/or whether the database partition comprises at least a predetermined number of overflow blocks.

The reorganization utility 214 ranks the set of database partitions according to a rank criteria. The rank criteria preferably includes the fragmentation indicator. The rank criteria may also include other parameters such as a database name or volume number.

The reorganization utility 214 reorganizes a subset of the ranked set of database partitions. Reorganizing a database partition comprises arranging the data making up the database partition in an optimal manner on a storage device 202. The subset of database partitions is defined, at least in part, by a rank order for the ranked set of database partitions. Preferably, the reorganization utility 214 reorganizes the subset of the ranked set of database partitions in rank order by reorganizing the highest ranked database partition first and the lowest ranked database partition last.

The subset of the database partitions may include database partitions that satisfy a reorganization threshold. Preferably, the reorganization threshold is a number (quantity) of the ranked database partitions or a percentage of the ranked database partitions. In one embodiment, the user 216 may manually add or remove a selected database partition to the subset of the database partitions through the user interface 218 so that the reorganization utility 214 also reorganizes the selected database partition. The user 216 may add or remove a selected database partition for various reasons including known characteristics about the partition such as its location, access frequency, size, type, history, or the like.

In one embodiment, the reorganization utility 214 presents the ranked set of database partitions to a user 216 via the user interface 218 for evaluation. Preferably, the reorganization utility 214 prompts the user 216 for a reorganization threshold in response to the evaluation. The reorganization utility 214 may also recommend a reorganization threshold to the user 216.

In one embodiment, the reorganization utility 214 estimates a quantity of computing resources required to reorganize the subset of database partitions. The reorganization utility 214 may also estimate a database performance improvement that will result from reorganizing the subset of database partitions. The reorganization utility 214 may present the user 216 (via the user interface 218) with the estimated quantity of computing resources required for the reorganization and the estimated database improvement that will result from the reorganization. The user interface 218 may comprise a command line interface, an entry panel-driven interface, a Graphical User Interface (GUI), a batch interface, or a combination of these.

Figure 3:
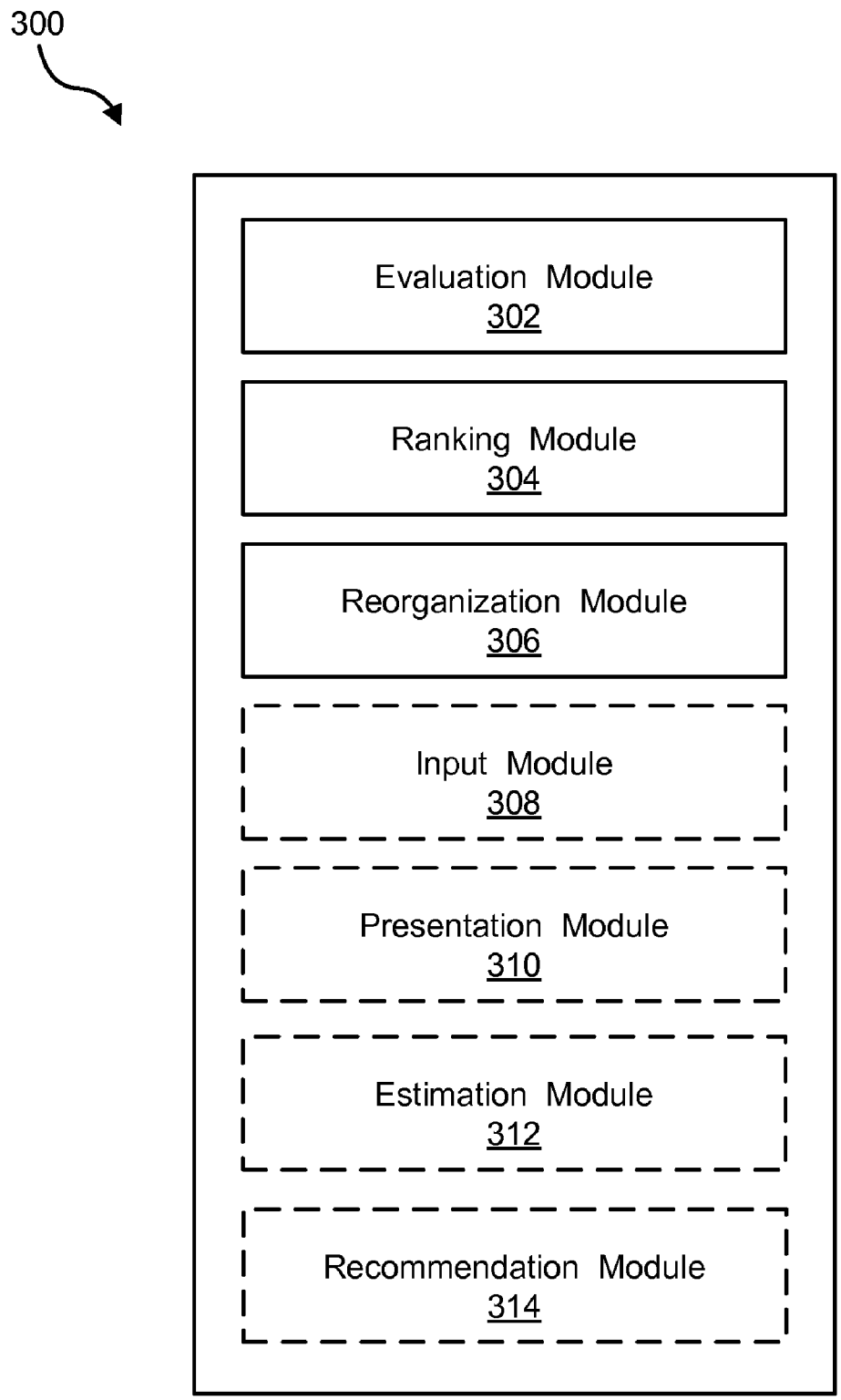
FIG. 3 is a block diagram illustrating one embodiment of an apparatus for reorganizing a set of database partitions in accordance with the present invention.

FIG. 3 illustrates one embodiment of an apparatus 300 for reorganizing a set of database partitions. In one embodiment, the apparatus 300 is configured to serve as the reorganization utility 214 described above in relation to FIG. 2. The apparatus 300 includes an evaluation module 302, a ranking module 304, and a reorganization module 306. In one embodiment, the apparatus 300 may optionally also include an input module 308, a presentation module 310, an estimation module 312, and a recommendation module 314.

The evaluation module 302 determines a fragmentation indicator for each database partition within a set of database partitions. The fragmentation indicator may be a numerical value such as a percentage, a real number, or an integer, or an alphanumeric value. The process of determining a fragmentation indicator for a partition is relatively simple compared with reorganizing a partition and can be performed without substantial impact on database performance.

The fragmentation indicator indicates the degree to which a database partition has become fragmented on a storage device 202. The set of database partitions for which the evaluation module 302 determines a fragmentation indicator may include all the partitions of a database 204 or may include a subset of the partitions of a database 204.

For example, if a database 204 includes partitions on more than one storage device 202 the evaluation module 302 may determine a fragmentation indicator for the subset of partitions residing on one of the storage devices 202. Limiting the evaluation module 302 to a subset of the database partitions when the database 204 has a large number of partitions may be beneficial because the limitation minimizes the number of evaluations performed by the evaluation module 302.

Preferably, the fragmentation indicator is determined by evaluating a fragmentation function for each database partition within the set of database partitions. In one embodiment, the fragmentation function uses a combination of the number of overflow blocks assigned to the partition and the amount of free space in the partitions.

According to this particular fragmentation function, the evaluation module 302 first determines if the partition has been assigned at least a predetermined number of overflow blocks. The number of overflow blocks is a good indicator of fragmentation since partitions are not assigned overflow blocks unless at some point the original partition was not sufficient to store the fields of a database structure. If a database partition meets this test, the function determines whether the database partition has at least a predetermined amount of free space.

If the partition does have the predetermined amount of free space, the partition is a good candidate for reorganization because the partition is occupying overflow blocks that may or may not be contiguous with the rest of the partition when it could be storing the fields stored in these overflow blocks in free space available within the original partition. This function may give a result indicating the relative desirability of reorganizing the partition. For example, if the amount of free space in the original partition could hold all of the fields stored in overflow blocks so that the overflow blocks could be eliminated, the partition would receive a very high desirability value.

On the other hand, if none of the fields stored in overflow blocks could fit within the free space of the original partition, the partition would receive a low desirability value. The desirability values may be distributed from zero to ten where ten is the most desirable and zero the least desirable and may be used as the fragmentation indicator for a partition. Of course, other ranges of desirability values could be used as well.

In yet another embodiment, the fragmentation function uses a combination of the number of independent overflow blocks assigned to the partition and the amount of free space in dependent overflow blocks assigned to the partition. The evaluation module 302 first determines if the partition has been assigned at least a predetermined number of independent overflow blocks. If this test is met, the fragmentation function determines whether the dependent overflow blocks assigned to the partition comprise at least a predetermined amount of free space.

This particular fragmentation function may give a result indicating the relative desirability of reorganizing the partition. For example, if the amount of free space in the dependent overflow blocks could hold all of the fields stored in the independent overflow blocks so that the independent overflow blocks could be eliminated, the partition would receive a very high desirability value. On the other hand, if none of the fields stored in independent overflow blocks could fit within the free space of the dependent overflow blocks, the partition would receive a low desirability value. The desirability values may be distributed from zero to ten where ten is the most desirable and zero the least desirable, and may be used as the fragmentation indicator for a partition.

In another embodiment, the fragmentation function is a percentage obtained by dividing the total space in bytes occupied by data of the partition residing in overflow blocks by the total space in bytes occupied by substantially all data residing in substantially all blocks of the partition. The number of dependent overflow blocks required by a partition, and the number of independent overflow blocks required by a partition may also serve as fragmentation functions.

Two or more fragmentation functions may be combined to create a new fragmentation function. For example, a weighted sum of the number of dependent overflow blocks and the number of independent overflow blocks may serve as a fragmentation function. The user 216 may specify a fragmentation function for the evaluation module 302 by selecting a fragmentation function from a set of available fragmentation functions or may specify a new fragmentation function. Alternatively, the evaluation module 302 may use a default fragmentation function.

The ranking module 304 ranks the set of database partitions in order according to a rank criteria. In one embodiment, the rank criteria is the fragmentation indicator determined by the evaluation module 302. In this embodiment, the ranking module 304 creates an ordered list of the set of database partitions with the database partition having the highest fragmentation indicator at the top of the list and the database partition having the lowest fragmentation indicator at the bottom of the list.

In another embodiment, the rank criteria includes other parameters, such as a database name or storage device 202, in addition to the fragmentation indicator. In this embodiment, multiple lists of the set of database partitions may be created. For example, if the set of database partitions are spread over two storage devices 202, the ranking module 304 may create an ordered list of for each storage device 202. Each ordered list has the partition with the highest fragmentation indicator for that particular storage device 202 at the top or front of the list and the database partition having the lowest fragmentation indicator for that particular storage device 202 at the bottom or end of the list.

Of course, other rank criteria may also be used. For example, the size of the database partition may be included in the rank criteria so that the ranking module 304 creates ordered lists for particular sizes of database partitions. In this example, the ranking module 304 may create a first ordered list for partitions larger than a first predetermined size and the ranking module 304 may create a second ordered list for partitions larger than a second predetermined size but smaller than the first predetermined size. Alternatively, the ranking module 304 may create a single ordered list sorted first by one attribute of rank criteria (such as fragmentation indicator) and then by a second attribute of the rank criteria.

In one embodiment, the ranking module 304 of the apparatus 300 executes on a client computer while the remaining modules of the apparatus 300 execute on a server computer. In this embodiment, the client computer communicates with the server computer via a communication bus 210. The communication bus 210 may comprise an internal bus or an external communication link.

The reorganization module 306 reorganizes a subset of the ranked set of database partitions provided by the ranking module 304. The reorganization module 306 selects the subset from the ranked set of database partitions based on a rank order. In one embodiment, the reorganization module 306 uses a reorganization threshold to select the subset of partitions. In this embodiment, those ranked partitions that satisfy the reorganization threshold are included in the subset. The reorganization threshold may be a quantity of partitions. For example, the top ten ranked partitions or the top fifteen ranked partitions. The reorganization threshold may also be a percentage. For example, the top two percent of the ranked partitions or the top five percent of the ranked partitions.

In one embodiment, the evaluation module 302 stores the fragmentation indicators for each database partition in a data repository. In this embodiment, the other modules of the apparatus 300 may access the data repository to retrieve the fragmentation indicators. The data repository may also be used by the ranking module 304 to store the ordered list of the set of ranked database partitions. The reorganization module 306 may access the ranked set of database partitions from the data repository in order to select the subset based on a reorganization threshold. Use of the data repository allows the modules of the apparatus 300 to be distributed among different computing devices, in certain embodiments.

In one embodiment, the presentation module 310 presents the ranked set of database partitions to a user 216 for evaluation. The user 216 may examine the ranked set of database partitions, select or adjust a reorganization threshold, and provide the input module 308 with the selected reorganization threshold. The input module 308 may provide the selected reorganization threshold to the reorganization module 306.

The reorganization module 306 may also use a default reorganization threshold if the user 216 does not provide a reorganization threshold.

In one embodiment, the estimation module 312 estimates a quantity of computing resources required to reorganize the subset of database partitions. The quantity of computing resources may be an amount of time, a number of Central Processing Unit (CPU) clock cycles, a number of Floating Point Operations (FLOPS), or other units of measure well known to those of skill in the art.

The estimation module 312 estimates the quantity of computing resources required for each partition satisfying the reorganization threshold. The estimation module 312 may provide the user 216 with a set of estimates, one for each partition within the subset, or may provide the user 216 with single estimate for the subset representing the quantity of computing resources required to reorganize the entire subset. The estimation module 312 may base its estimate on the number of bytes of non-contiguous data that need to be relocated to reorganize the partition, the availability of free blocks adjacent to the partition, the amount of free space within the partition, the seek time of the storage device 202, the write speed of the storage device 202, and other factors well known to those of skill in the art.

The estimation module 312 may also estimate a database performance improvement that will result from reorganizing the subset of database partitions. The performance improvement may be in terms of free space that the contemplated reorganization will create, reduced read time required to read a database structure stored by the partition, or the like. The estimation module 312 may base its estimated performance improvement on the amount of free space in the partitions, the seek time of the storage device 202, the read speed of the storage device 202, and other factors well known to those of skill in the art. The presentation module 310 may present the user 216 with the estimated quantity of computing resources required and/or the estimated database improvement.

In one embodiment, the recommendation module 314 provides a recommended reorganization threshold to the user 216. The recommendation module 314 may base its recommendation on a maximum amount of time allowed for the reorganization, an estimated amount of reorganization time required for each partition, or on other similar factors.

In one embodiment, a user 216 may manually add a selected database partition to the subset of the database partitions to be reorganized by the reorganization module 306 even though the selected partition does not satisfy the reorganization threshold. This ability may be helpful when the user 216 wants to reorganize a particular partition but does not want to reorganize other partitions with substantially the same ranking. Alternatively, or in addition, the input module 308 may allow the user to position the selected partition within the rank order of the subset to be reorganized.

Preferably, the reorganization module 306 reorganizes the subset of the ranked set of database partitions in rank order by reorganizing the highest ranked database partition first and the lowest ranked database partition last. Reorganizing the subset in rank order is advantageous since if a user 216 cancels the reorganization before all of the subset has been reorganized, the highest ranked partitions (those with the greatest impact on database performance) will have been reorganized first.

Alternatively, the reorganization module 306 may reorganize the subset of partitions in another order, such as the order in which the subset of partitions is stored on a storage device 202 or a revised order provided by a user 216 through the user interface 218. The reorganization module 306 may also attempt to reorganize the subset of partitions in their ranked order, but skip those partitions that are being accessed by a user 216 when their turn to be reorganized comes up and reorganize them later when they are not being accessed by a user 216. After the reorganization module 306 has reorganized the subset of partitions, the reorganization module 306 may provide the user 216 with an amount of storage space that was recovered by executing the reorganization.

Figure 1A:
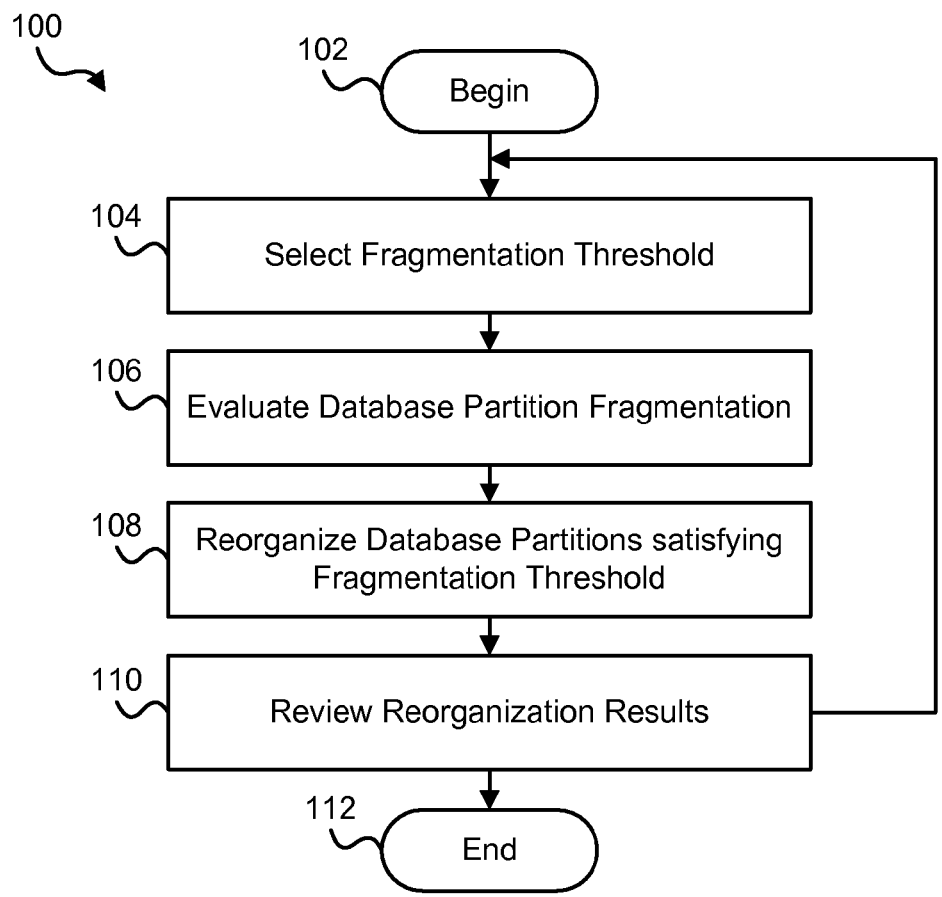
FIG. 1A is a flow chart diagram illustrating a method for reorganizing a database.
Figure 1B:
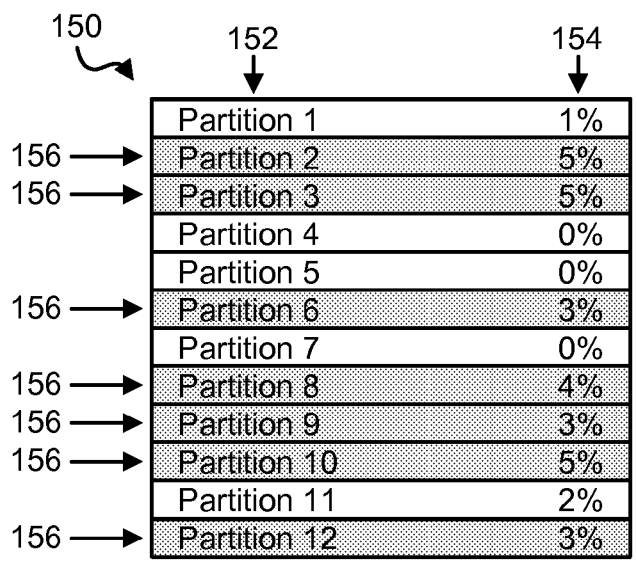
FIG. 1B is a chart illustrating an example set of database partitions and corresponding fragmentation values.
Figure 4A:
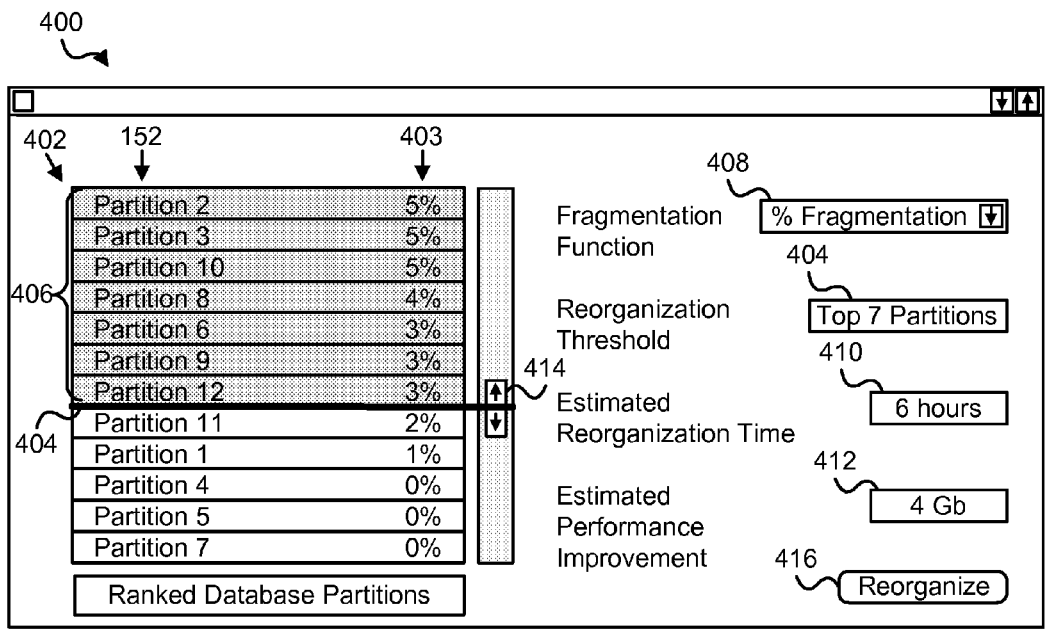
FIG. 4A is a graphical user interface illustrating reorganizing a set of database partitions in accordance with the present invention.

FIG. 4A illustrates an example graphical user interface (GUI) 400 used in accordance with the present invention to reorganize a set of database partitions. The GUI 400 includes a ranked set 402 of database partition identifiers 152 illustrated in FIG. 1B ranked according to their corresponding fragmentation indicators 403. A reorganization threshold 404 in the form of a number (quantity) of the ranked database partitions is also illustrated. For example, the reorganization threshold 404 may comprise the top six partitions of the ranked set 402. Of course, the reorganization threshold 404 could alternatively be in the form of a percentage of the ranked database partitions. The shaded database partition identifiers 406 above the reorganization threshold 404 represent the subset of database partitions to be reorganized by the reorganization module 306.

The GUI 400 allows a user 216 to select the fragmentation function 408 used by the evaluation module 302 to determine the fragmentation indicators 403 for the partitions. The dropdown list 408 may present a plurality of potential fragmentation functions 408. The GUI 400 displays an estimated reorganization time 410 and an estimated performance improvement 412 both provided by the estimation module 312. Of course, the GUI 400 could display an estimated quantity of resources other than time, such as a number of CPU clock cycles as discussed above in relation to FIG. 3.

The GUI 400 illustrates the information that a user 216 is presented prior to the reorganization module 306 being allowed to reorganize the subset of partitions. The reorganization threshold 404 represents an initial reorganization threshold selected either by the user 216 or by default. However, the user 216 may choose to change the reorganization threshold 404 based on the ranked set of database partitions provided by the GUI 400.

For example, the user 216 may decide that the number of shaded database partition identifiers 406 is too large, or that the estimated reorganization time 410 is too long. As a result, the user 216 may use a slider control 414 to change the reorganization threshold 404 to a more desirable value before pressing a reorganization button 416 to initiate a reorganization of the subset of partitions.

Figure 4B:
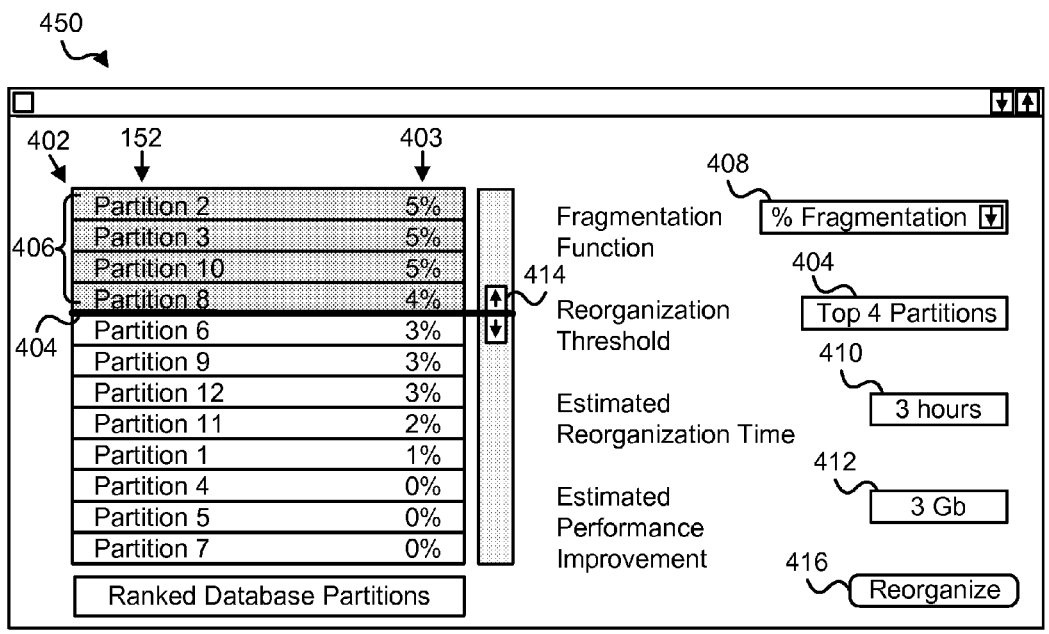
FIG. 4B is a graphical user interface illustrating reorganizing a set of database partitions in accordance with the present invention.

FIG. 4B illustrates another example Graphical User Interface (GUI) 450 used in accordance with the present invention to reorganize a set of database partitions. The GUI 450 is an updated version of the GUI 400 of FIG. 4A resulting from changing the reorganization threshold 404 from the top six partitions to the top four partitions. Notice that the number of shaded database partition identifiers 406 has decreased. In addition, the estimated reorganization time 410 has also decreased. The estimated reorganization time 410 may now be acceptable to the user 216 and the user 216 may press the reorganization button 416 to begin the reorganization.

FIGS. 4A and 4B illustrate one advantage provided by the apparatus 300. Using the apparatus 300, the user 216 may view the anticipated impact of a particular reorganization threshold 404 prior to the reorganization taking place. The user 216 may view the ranked set of partitions 402 to see the degree of fragmentation present in the partitions.

The user 216 may also view the estimated reorganization time 410. Using the information provided by the ranked set of partitions 402 and estimated reorganization time 410, the informed user 216 may select a reorganization threshold 404 that meets the desired constraints. For example, the user 216 may select a reorganization threshold 404 that permits a reorganization to fit within four hour low usage period.

Conventional methods of partition reorganization require the user 216 to select a reorganization threshold without the benefit of a ranked set of partitions 402 or estimated reorganization time 410. As a result, users of conventional methods use a trial and error process to determine an appropriate reorganization threshold, often suffering adverse consequences such as disturbing database users by slowing down database response.

Figures 5A, 5B:
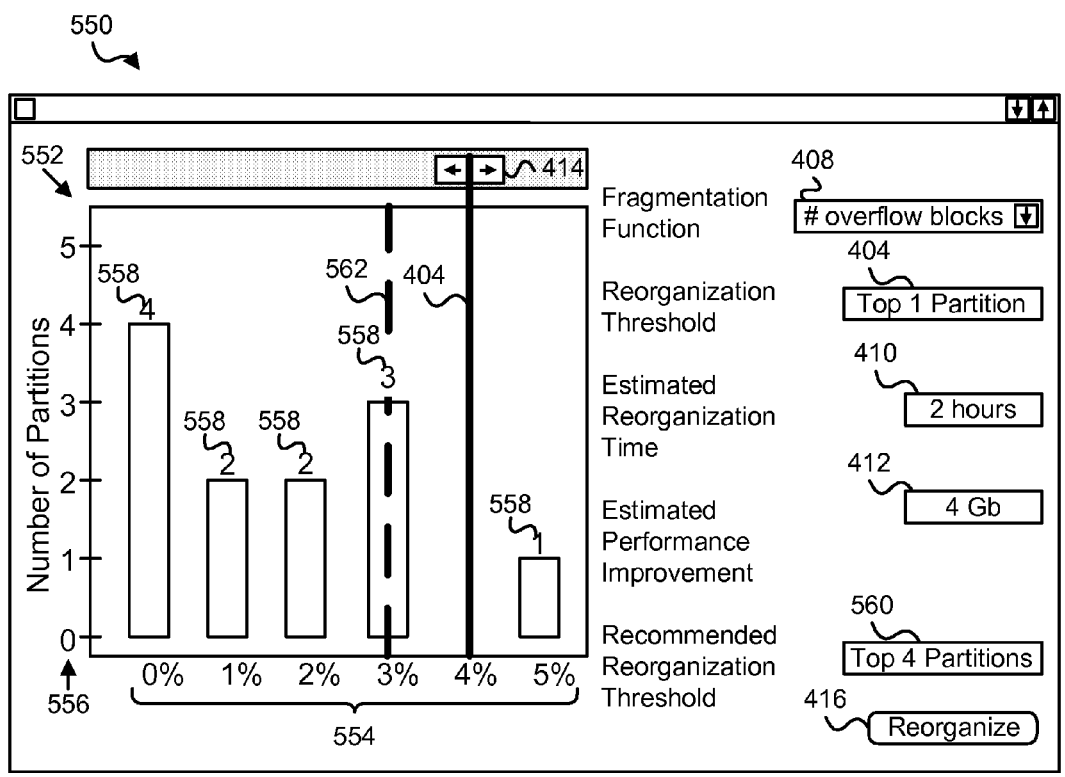
FIG. 5A is a chart illustrating an example set of database partitions and corresponding fragmentation indicators.
FIG. 5B is a graphical user interface illustrating reorganizing a set of database partitions in accordance with the present invention.

FIG. 5A is a chart 500 illustrating an example set of database partition identifiers 152 and corresponding fragmentation indicators 403. The fragmentation indicators 403 are percentages representing the amount of data in the partition that is fragmented.

FIG. 5B illustrates another example Graphical User Interface (GUI) 550 used in accordance with the present invention to reorganize a set of database partitions. The GUI 550 presents a user 216 with information about the partition identifiers 152 and corresponding fragmentation indicators 403 of chart 500 illustrated in FIG. 5A. The GUI 550 includes a histogram chart 552. The x-axis 554 of the histogram chart 552 comprises discrete fragmentation indicators 403. The y-axis 556 of the histogram chart 552 comprises the number of partitions having a particular fragmentation indicator 403. A partition count 558 enables the user 216 to quickly determine how many partitions have a particular fragmentation indicator 403. For example, FIG. 5B illustrates that two partitions have a fragmentation indicator 403 of one percent.

The GUI 550 provides a more intuitive manner of viewing the fragmentation of the partitions than the chart 500 of FIG. 5A. The GUI 550 allows the user 216 to select the fragmentation function 408 used by the evaluation module 302 and displays an estimated reorganization time 410 and an estimated performance improvement 412, both provided by the estimation module 312.

The GUI 550 also allows the user 216 to select a reorganization threshold 404. The reorganization threshold 404 may be selected by entering a value in the reorganization threshold 404 box or by adjusting a slider control 414 in the histogram chart 552. As the user 216 adjusts the reorganization threshold 404, the estimation module 312 correspondingly calculates a new estimated reorganization time 410 and estimated performance improvement 412.

The GUI 550 may also display a recommended reorganization threshold 560 provided by the recommendation module 314. The recommended reorganization threshold 560 may be displayed as a dashed line 562 in the histogram chart 552. The dashed line 562 assists the user 216 in quickly recognizing if the selected reorganization threshold 404 is significantly different from the recommended reorganization threshold 560. In this embodiment, the user 216 may recognize the advantages of changing the selected reorganization threshold 404 to the recommended reorganization threshold 560.

Once the user 216 has evaluated the estimated reorganization time 410, estimated performance improvement 412, and recommended reorganization threshold 560, and made desired changes to the reorganization threshold 404, the user 216 pushes the reorganization button 416 to initiate reorganization of the subset of partitions satisfying the reorganization threshold 404.

Figure 6:
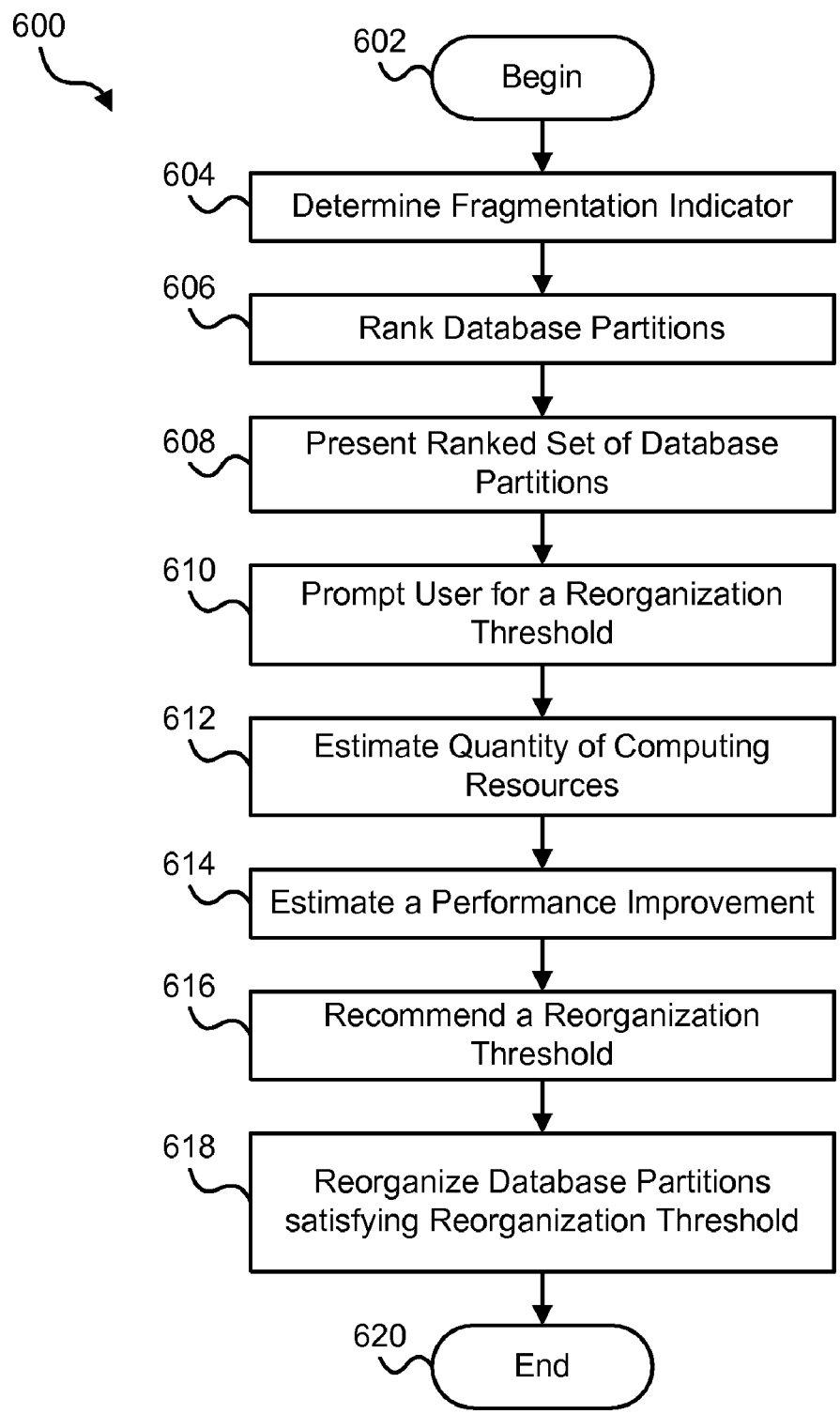
FIG. 6 is a flow chart diagram illustrating one embodiment of a method for reorganizing a set of database partitions in accordance with the present invention.

FIG. 6 is flow chart diagram illustrating one embodiment of a method 600 for reorganizing a set of database partitions.

Preferably, the method 600 is implemented in a conventional system by modifying computer readable code to implement the apparatus 300 described above.

The method 600 begins 602 when the evaluation module 302 determines 604 a fragmentation indicator for each database partition within a set of database partitions. The fragmentation indicator may be a numerical value such as a percentage, a real number, or an integer that indicates the degree to which a database partition has become fragmented. As discussed above, the evaluation module 302 may use a fragmentation function 408 to determine the fragmentation indicator.

Next, the ranking module 304 ranks 606 the database partitions according to a rank criteria. As described above, the rank criteria includes the fragmentation indicator and may include other parameters such as a database name or storage device 202. As discussed above, the rank criteria may be used to create one or more ranked lists of the set of database partitions.

Next, in one embodiment, the presentation module 310 presents 608 the ranked set 402 of database partitions to a user 216 for evaluation. Preferably, the input module 308 prompts 610 a user 216 for a reorganization threshold 404. Based on the reorganization threshold 404, the estimation module 312, in one embodiment, estimates 612 a quantity of computing resources required to reorganize the subset and estimates 614 a resulting performance improvement.

The recommendation module 314 may optionally recommend 616 a reorganization threshold 560. As discussed above, the user 216 may adjust the reorganization threshold 404 in response to evaluating the estimated quantity of computing resources, the estimated performance improvement 412, and/or the recommended reorganization threshold 560.

Next, the reorganization module 306 selects a subset of the ranked set of database partitions based, at least in part, on a rank order for the ranked set 402 of database partitions. In one embodiment, the subset comprises partitions satisfying the reorganization threshold 404. Finally, the reorganization module 306 reorganizes 618 the subset of database partitions and the method 600 ends 620.

A method for reorganizing a set of database partitions for a client uses the reorganization utility 214 described above. A service provider executes the reorganization utility 214 against a set of database partitions owned by the client. Next, the service provider evaluates a ranked set 402 of database partitions provided by the reorganization utility 214 and in response to the evaluation provides a reorganization threshold 404 to the reorganization utility 214.

Next, the reorganization utility 214 reorganizes a subset of the set of database partitions that satisfy the reorganization threshold 404. In one embodiment, the reorganization utility 214 includes an estimation module 312 for estimating a quantity of computing resources required to reorganize the subset and for estimating a performance improvement that will result from reorganizing the subset.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as data value programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Furthermore, modules implemented in software need not be confined to a single processor. For instance, each module may execute on a different processor. In another embodiment, a module may be executed by a plurality of parallel processors.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

What is claimed is:

1. An apparatus comprising:
a computer readable storage medium storing computer readable program code executable by a processor, the computer readable program code comprising:
an evaluation module that determines a fragmentation indicator for each database partition within a set of database partitions stored on the computer readable storage medium;
a ranking module that ranks the database partitions according to a rank criteria comprising at least the fragmentation indicator;
a presentation module that presents the ranked set of database partitions for evaluation, the presentation module displaying by way of a graphical user interface one or more indicators representing database partitions that are members of a recalculated subset of database partitions, in response to adjusting a graphically represented reorganization threshold slider bar by way of the graphical user interface, the graphical user interface displaying updated resource requirements based on the recalculated subset of database partitions;
an input module that prompts for a dynamic reorganization threshold in response to the evaluation, the dynamic reorganization threshold defining a subset of database partitions, the subset of database partitions dynamically recalculated in response to changing the dynamic reorganization threshold, the dynamic reorganization threshold changed in response to adjusting the graphically represented reorganization threshold slider bar by way of the graphical user interface; and
a reorganization module that reorganizes a subset of database partitions in the ranked set of database partitions that satisfy the dynamic reorganization threshold wherein the subset is defined at least in part by a rank order for the ranked set of database partitions.

2. The apparatus of claim 1, further comprising an estimation module that estimates a quantity of computing resources required to reorganize the subset of database partitions in the ranked set of database partitions that satisfy the dynamic reorganization threshold and estimate a performance improvement that will result from reorganizing the subset of database partitions in the ranked set of database partitions that satisfy the dynamic reorganization threshold.

3. The apparatus of claim 1, further comprising a recommendation module that recommends a dynamic reorganization threshold.

4. The apparatus of claim 1, wherein the dynamic reorganization threshold has a type selected from the group consisting of a number of ranked database partitions and a percentage of ranked database partitions.

5. The apparatus of claim 1, wherein the reorganization module reorganizes the subset of the database partitions in rank order by reorganizing the highest ranked database partition first and the lowest ranked database partition last.

6. The apparatus of claim 1, wherein the evaluation module evaluates a fragmentation function for each database partition within the set of database partitions.

7. The apparatus of claim 6, wherein the fragmentation function comprises determining whether a database partition comprises at least a predetermined amount of free space and determining whether the database partition comprises at least a predetermined number of overflow blocks.

8. The apparatus of claim 1, wherein the input module changes the subset of the database partitions by adding or removing a database partition from the subset in response to an input.

9. The apparatus of claim 1, wherein the subset of database partitions comprises all of the database partitions in the ranked set of database partitions.

10. A system for reorganizing a set of database partitions for a client, the system comprising:
a processor;
one or more storage devices storing a database comprising a set of database partitions;
one or more Input/Output (I/O) devices;
a memory;
a reorganization utility comprising:
an evaluation module that determines a fragmentation indicator for each database partition within a set of database partitions;
a ranking module that ranks the database partitions according to a rank criteria comprising at least the fragmentation indicator;
a presentation module that presents the ranked set of database partitions for evaluation, the presentation module displaying by way of a graphical user interface one or more indicators representing database partitions that are members of a recalculated subset of database partitions, in response to adjusting a graphically represented reorganization threshold slider bar by way of the graphical user interface, the graphical user interface displaying updated resource requirements based on the recalculated subset of database partitions;
an input module that prompts for a dynamic reorganization threshold in response to the evaluation, the dynamic reorganization threshold defining a subset of database partitions, the subset of database partitions dynamically recalculated in response to changing the dynamic reorganization threshold, the dynamic reorganization threshold changed in response to adjusting the graphically represented reorganization threshold slider bar by way of the graphical user interface; and
a reorganization module that reorganizes a subset of database partitions in the ranked set of database partitions that satisfy the dynamic reorganization threshold; and
a communication bus, the communication bus operatively coupling the processor, the one or more storage devices, the one or more I/O devices, and memory.

11. The system of claim 10, wherein the reorganization utility further comprises an estimation module configured to estimate a quantity of computing resources required to reorganize the subset of database partitions in the ranked set of database partitions that satisfy the dynamic reorganization threshold and estimate a performance improvement that will result from reorganizing the subset of database partitions in the ranked set of database partitions that satisfy the dynamic reorganization threshold.

12. The system of claim 10, wherein the reorganization utility further comprises a recommendation module that recommends a dynamic reorganization threshold.

13. The system of claim 10, wherein the dynamic reorganization threshold has a type selected from the group consisting of a number of ranked database partitions and a percentage of ranked database partitions.

14. A computer program product comprising a computer readable storage medium having computer readable program code embodied therein to reorganize a set of Data Entry Data Base (DEDB) Units of Work (UOWs), the computer readable program code configured to:
- determine a fragmentation indicator for each DEDB UOW within a set of DEDB UOWs and to evaluate a fragmentation function for each DEDB UOW within the set of DEDB UOWs;
- rank the DEDB UOWs according to a rank criteria comprising at least the fragmentation indicator;
- define a subset of DEDB UOWs, the DEDB UOWs satisfying a dynamic reorganization threshold;
- recalculate the subset of DEDB UOWs in response to changing the dynamic reorganization threshold, the dynamic reorganization threshold changed in response to adjusting a graphically represented reorganization threshold slider bar by way of a user interface;
- display by way of a graphical user interface one or more indicators representing DEDB UOWs that are members of the recalculated subset of DEDB UOWs in response to adjusting the graphically represented reorganization threshold slider bar by way of the graphical user interface, and displaying updated resource requirements based on the recalculated subset of DEDB UOWs; and
- reorganize the subset of the DEDB UOWs in the ranked set of DEDB UOWs wherein the subset is defined at least in part by a rank order for the ranked set of DEDB UOWs.

15. The computer program product of claim 14, further comprising estimating a quantity of computing resources required to reorganize the subset of DEDB UOWs.

16. The computer program product of claim 14, further comprising estimating a performance improvement that will result from reorganizing the subset of DEDB UOWs.

17. The computer program product of claim 14, wherein determining a fragmentation indicator further comprises evaluating a fragmentation function for each DEDB UOW within the set of DEDB UOWs.

18. The computer program product of claim 17, wherein the fragmentation function comprises determining whether a DEDB UOW comprises at least a predetermined amount of free space and determining whether the DEDB UOW comprises at least a predetermined number of overflow control intervals.

19. The computer program product of claim 14, wherein reorganizing database partitions further comprises reorganizing the subset of the database partitions in rank order by reorganizing the highest ranked database partition first and the lowest ranked database partition last.

20. The computer program product of claim 14, further comprising changing the subset of the DEDB UOWs by adding or removing a DEDB UOW from the subset in response to an input.

* * * * *